(12) United States Patent
Yamamoto et al.

(10) Patent No.: US 6,514,631 B1
(45) Date of Patent: Feb. 4, 2003

(54) HEATING FURNACE TUBE AND METHOD OF MANUFACTURING THE SAME

(75) Inventors: Katsumi Yamamoto; Takeo Murata; Rin Sasano, all of Yokohama; Kenji Sato, Tokyo; Toshikazu Nakamura, Yokosuka; Muneyasu Ichimura, Tokyo; Kunio Ishii, Yokohama; Keizo Hosoya, Hitachinaka, all of (JP)

(73) Assignee: JGC Corporation, Tokyo (JP)

( * ) Notice: Subject to any disclaimer, the term of this patent is extended or adjusted under 35 U.S.C. 154(b) by 0 days.

(21) Appl. No.: 09/485,871
(22) PCT Filed: Aug. 19, 1998
(86) PCT No.: PCT/JP98/03673
§ 371 (c)(1), (2), (4) Date: May 1, 2000
(87) PCT Pub. No.: WO99/09230
PCT Pub. Date: Feb. 25, 1999

(30) Foreign Application Priority Data

Aug. 20, 1997 (JP) ............................................ 9-223873
Jan. 23, 1998 (JP) ............................................ 10-11422

(51) Int. Cl.$^7$ .................. B32B 15/00; B23K 20/00; F16L 9/00
(52) U.S. Cl. .................. 428/682; 138/142; 138/143; 138/177; 228/127; 228/128; 228/132; 228/133; 228/138; 228/194; 228/212; 228/218; 228/262.41; 428/679; 428/680; 428/683; 428/684; 428/685; 428/935; 428/941
(58) Field of Search .................. 428/682, 683, 428/684, 685, 679, 680, 935, 941; 228/127, 128, 132, 133, 138, 194, 212, 218, 262.41; 138/142, 143, 177; 420/40, 79, 83; 148/331

(56) References Cited

FOREIGN PATENT DOCUMENTS

| JP | 2-156049 A | * | 6/1990 | ........... C22C/38/00 |
| JP | 2-213449 |   | 8/1990 |                       |
| JP | 4-147947 A | * | 5/1992 | ........... C22C/38/00 |
| JP | 7-166290 A | * | 6/1995 | ........... C22C/30/00 |

* cited by examiner

Primary Examiner—Robert R. Koehler
(74) Attorney, Agent, or Firm—Greer, Burns & Crain, Ltd.

(57) ABSTRACT

A heating furnace tube, a method of using the same and a method of manufacturing the same which have been developed with a view to eliminating inconveniences occurring when a carbon-containing fluid is made to flow in the heating furnace tube. The heating furnace tube which comprises a rare earth oxide particle distributed iron alloy containing 17–26 wt. % of Cr and 2–6 wt. % of Al. The method of manufacturing this heating furnace tube which comprises the steps of forming or inserting an insert metal on or into at least one of a joint end portion of one heating furnace tube element and that of the other heating furnace tube element, bringing these two joint end portions into pressure contact with each other directly or via an intermediate member, and diffusion welding the two heating furnace tube elements to each other by heating the insert metal.

11 Claims, 12 Drawing Sheets

| No | COMPOSITION | COKING RESISTANCE | HIGH TEMPERATURE OXIDATION RESISTANCE | HIGH TEMPERATURE STRENGTH | DUCTILITY |
|---|---|---|---|---|---|
| 1 | Fe-17Cr | * | * | * | ○ |
| 2 | Fe-25Cr | △ | ○ | * | ○ |
| 3 | Fe-14Cr-1, 2Al | △ | ○ | * | ○ |
| 4 | Fe-19Cr-1, 2Al | △ | ○ | * | ○ |
| 5 | Fe-20Cr-3Al | △ | ◎ | * | ○ |
| 6 | Fe-20Cr-4Al | △ | ◎ | * | ○ |
| 7 | Fe-21Cr-8Al | ○ | ◎ | * | * |
| 8 | Fe-20Cr-3Al-$Y_2O_3$ | ◎ | ◎ | ◎ | ○ |
| 9 | Fe-21Cr-4Al-$Y_2O_3$ | ◎ | ◎ | ◎ | ○ |
| 10 | Fe-21Cr-5Al-$Y_2O_3$ | ◎ | ◎ | ◎ | ○ |
| 11 | Fe-21Cr-6Al-$Y_2O_3$ | ◎ | ◎ | ◎ | ○ |
| 12 | Fe-26Cr-6Al-$Y_2O_3$ | ◎ | ◎ | ◎ | ○ |
| 13 | Fe-26Cr-8Al-$Y_2O_3$ | ◎ | ◎ | ◎ | * |
| 14 | Fe-28Cr-6Al-$Y_2O_3$ | ◎ | ◎ | ◎ | △ |
| 15 | Fe-28Cr-8Al-$Y_2O_3$ | ◎ | ◎ | ◎ | * |

FIG.1

| TEMPERATURE (°C) | PRESENT INVENTION | | MATERIAL TO COMPARE | |
|---|---|---|---|---|
| | S : 100ppm | S : 0ppm | S : 100ppm | S : 0ppm |
| 900 | 1 | 3 | 2 | 22 |
| 1000 | 1 | 3 | 12 | 30 |
| 1100 | 1 | 3 | 64 | 54 |

FIG.3

HEATING FURNACE TUBE AND METHOD OF MANUFACTURING THE SAME

TECHNICAL FIELD

The present invention relates to a heating furnace tube, a method of using the heating furnace tube, and a method of manufacturing the heating furnace tube, and more particularly to a heating furnace tube whose problems are coking and carburization during operation at high temperature, such as a cracking tube of an ethylene plant, a method of using such a heating furnace tube and a method of manufacturing such a heating furnace tube.

BACKGROUND ART

In a cracking tube of an ethylene plant used as a heating furnace tube, for example, the coking is a problem, where carbon precipitates and deposits on the inner surface of the tube in the atmosphere of gas including carbon, such as, hydrocarbon, when the temperature is in the temperature range where carbon precipitation occurs.

If coking is generated on the inner surface of the heating furnace tube, such serious problems as overheating and plugging may occur during the operation of the plant. Therefore decoking to remove deposited carbon by burning in a high temperature steam atmosphere must be performed frequently, and to perform decoking, operation of the plant must temporarily be stopped, which causes a considerable drop in productivity.

Technologies which have been developed to solve this problem include the construction of a heating furnace tube made of material with Al-contained oxide film on the surface created by adding 1–10% Al to ferric alloy, or material with a high Al-contained layer created by aluminizing the surface of base alloy.

In these conventional art, however, coking resistance is actually improved, but it is not yet sufficient to use the tube as a heating furnace tube in an actual industrial furnace.

With the foregoing in view, it is an object of the present invention to provide a heating furnace tube which has good coking resistance and can prevent a drop in productivity due to decoking and a method of using the heating furnace tube.

In the case of a heating furnace tube which causes carburization, such as the case of a cracking tube of an ethylene plant, the depth of carburization on the inner surface of the heating furnace tube is measured regularly to prevent damage on the heating furnace tube caused by carburization, and since operation of the plant must be stopped at each measurement, productivity drops considerably.

Oxide dispersion strengthened (ODS) ferrous alloy, which is ferritic high chrome alloy (20Cr—5Al—Fe) where rare earth oxide is dispersed, is known to have an extremely excellent high temperature strength and carburization resistance compared with conventional materials, and is therefore applied to a heating furnace tube, including joining method using fusion welding, friction welding, blazing or mechanical joint method.

With the fusion welding method by TIG welding and electronic beam welding, which involves the fusion of joint areas, however, oxide particles float up and the dispersion strengthening function, which is a feature of rare earth ODS ferrous alloy, is lost, dropping high temperature to half or less.

With the friction welding method, which does not involve the fusion of material, high temperature strength does not drop very much but the high jointing pressure generates a big burr at the joint area of the heating furnace tube, which will block the flow of fluid in the heating furnace tube.

With brazing, high heat resistance cannot be expected because the melting point of the brazing filler metal is much lower than that of the base material, and with the mechanical joint method, such as riveting and screwing, maintaining air tightness at high temperature is extremely difficult, therefore both methods are inappropriate for jointing the heating furnace tubes.

In this way, conventional jointing methods have difficulties to meet requirements for the joint areas of heating furnace tubes, including carburization, air tightness and high reliability, in addition to extremely high temperature strength and carburization resistance.

With the foregoing in view, it is an object of the present invention to provide a heating furnace tube which can prevent a drop in productivity caused by carburization measurement as much as possible, and a method of manufacturing the heating furnace tube.

As mentioned above, an object of the present invention is to provide a heating furnace tube that can solve problems that occur to a heating furnace tube used for fluid that contains carbon, such as hydrocarbon, a method of using the heating furnace tube, and a method of manufacturing the heating furnace tube.

In other words, an object of the present invention is to provide a heating furnace tube that can implement extremely good coking resistance and can prevent a drop in productivity due to decoking as much as possible, and a method of using the heating furnace tube, as well as to provide a heating furnace tube that can prevent a drop in productivity due to carburization measurement as much as possible, and a method of manufacturing the heating furnace tube.

DISCLOSURE OF THE INVENTION

A heating furnace tube used for the fluid containing hydrocarbon or carbon monoxide, is made of rare earth ODS ferrous alloy which contains 17–26% of Cr by weight and 2–6% of Al by weight.

With this configuration, rare earth ODS ferrous alloy which contains 17–26% of Cr by weight and 2–6% of Al by weight has extremely good coking resistance, therefore coking by the operation of an ethylene plant can be minimized and the interval of decoking can be extended much longer than a conventional cracking tube, and as a consequence, a drop in productivity due to decoking can be prevented.

The heating furnace tube can have a heating furnace tube element on one side made of rare earth ODS ferrous alloy which contains 17–26% of Cr by weight and 2–6% of Al by weight is joined with an heating furnace tube element on the other side made of the above mentioned rare earth ODS ferrous alloy or heat resistant alloy by diffusion bonding via insert metal.

With this configuration, at least one heating furnace tube element is made of rare earth ODS ferrous alloy which has good carburization resistance, therefore the interval of replacing a heating furnace tube can be extended longer than a conventional heating furnace tube when used for an ethylene plant, and as a consequence, cost for heating furnace tube replacement due to the progress of carburization can be decreased, and a drop in productivity can be prevented because the interval of shutdowns of plant due to carburization depth measurement is extended.

Also with this configuration, cost of the plant can be decreased considerably by using a heating furnace tube element made of heat resistant alloy for a part of a long heating furnace tube of an ethylene plant.

The heating furnace tube can be used for allowing fluid containing 100 ppm or less of S in atomic weight units to flow, and is used in a 550° C.–1000° C. temperature range.

With this configuration, the coking on rare earth ODS ferrous alloy and heating resistant alloy can be minimized, therefore the interval of decoking can be extended much longer than a conventional heating furnace tube, and as a consequence a drop in productivity due to decoking can be prevented.

The heating furnace tube can have a coupling short pipe to which the joint side edge of the heating furnace tube element on one side and the joint side edge of the heating furnace tube element on the other side are inserted, and the heating furnace tube element on one side and the heating furnace tube element on the other side are joined via the coupling short pipe by performing diffusion bonding in a state where the joint side edges of the heating furnace tube element on one side and the heating furnace tube element on the other side and the coupling short pipe are contact with pressure by a pressurization means via insert metal which is disposed between the joint side edges of the heating furnace tube element on one side and the heating furnace tube on the other side and the coupling short pipe.

With this configuration, the joint side edge of the heating furnace tube element on one side and the joint side edge of the heating furnace tube element on the other side are connected via the coupling short pipe, which makes centering of the heating furnace tube element on one side and the heating furnace tube element on the other side easier in the manufacturing process.

The heating furnace tube can comprise a tapered surface created by the outer surface of the coupling short pipe and a tightener which engages with the tapered surface and contacts the coupling short pipe in the radius direction.

With this configuration, the joint side edges of the heating furnace tube element on one side and the heating furnace tube element on the other side can surely be contact with pressure with the coupling short pipe with a simple structure.

The heating furnace tube may have an insert metal formed by plating.

With this configuration, insert metal can be simply and surely disposed between the joint side edges of the heating furnace tube element on one side and the heating furnace tube element on the other and the coupling short pipe.

The heating furnace tube may be used in a 550° C.–1200° C. temperature range.

With this configuration, brittle fractures caused by 475° C. embrittlement can be prevented and sufficient carburization resistance can be implemented.

A method of using the heating furnace tube can be characterized in that fluid containing hydrocarbon or carbon monoxide flows through the heating furnace tube made of rare earth ODS ferrous alloy which contains 17–26% of Cr by weight and 2–6% of Al by weight.

With this structure, rare earth ODS ferrous alloy which contains 17–26% of Cr by weight and 2–6% of Al by weight has extremely good coking resistance, therefore coking by operation of an ethylene plant can be minimized and the interval of decoking can be extended much longer than a conventional cracking tube, and as a consequence a drop in productivity due to decoking can be prevented.

The heating furnace tube element on the other side can be made of heat resistant alloy that is joined via insert metal by diffusion bonding.

With this configuration, the heating furnace tube element made of heat resistant alloy is used for a part of a long heating furnace tube of an ethylene plant, which can decrease the cost of the plant considerably.

The heating furnace tube can allow fluid containing 100 ppm or less of S in atomic weight units to flow, and be used in a 550° C.–1000° C. temperature range.

With this configuration, coking on rare earth ODS ferrous alloy and heat resistant alloy can be minimized, therefore the interval of decoking can be extended much longer than a conventional heating furnace tube, and as a consequence a drop in productivity due to decoking can be prevented.

A method of manufacturing a heating furnace tube comprises joining a heating furnace tube element on one side made of rare earth ODS ferrous alloy which contains 17–26% of Cr by weight and 2–6% of Al by weight with the heating furnace tube element on the other side made of rare earth ODS ferrous alloy or heat resistant alloy by diffusion bonding via insert metal, characterized in that the manufacturing method comprises of a process for forming or inserting the insert metal to at least one of the joint side edge of the heating furnace tube element on one side and the joint side edge of the heating furnace tube element on the other side, a process for contacting with pressure the joint side edge of the heating furnace tube element on one side and the joint side edge of the heating furnace tube element on the other side directly or via intermediate member, and a process for performing diffusion bonding the heating furnace tube element on one side and the heating furnace tube element on the other side by heating the insert metal.

With this configuration, at least one heating furnace tube element is manufactured to be a heating furnace tube made of rare earth ODS ferrous alloy with good carburization resistance, therefore the interval of heating furnace replacement can be extended longer than a conventional heating furnace tube when used in an ethylene plant, and as a consequence a drop in productivity can be prevented.

The manufacturing method of a heating furnace tube can comprise the insert metal being formed by plating.

With this configuration, the insert metal can be simply and surely disposed between joint side edges of the heating furnace tube element on one side and the heating furnace tube element on the other side and the coupling short pipe.

The manufacturing method of a heating furnace tube can comprise the intermediate member being a coupling short pipe to which the joint side edge of the heating furnace tube element on one side and the joint side edge of the heating furnace tube element on the other side are inserted, and the heating furnace tube element on one side and the heating furnace tube element on the other side are joined via the coupling short pipe by performing diffusion bonding in a state where the joint side edges of the heating furnace tube element on one side and a heating furnace tube element on the other side and the coupling short pipe are contact with pressure by a pressurization means via the insert metal disposed between the joint side edges of the heating furnace tube element on one side and the heating furnace tube element on the other side and the coupling short pipe.

With this configuration, the joint side edge of the heating furnace tube element on one side and the joint side edge of the heating furnace tube element on the other side are joined via a coupling short pipe as an intermediate member, which makes centering of the heating furnace tube element on one side and the heating furnace tube element on the other side easier in the manufacturing process.

A manufacturing method of a heating furnace tube is characterized in that the pressurization means made of the tapered surface created on the outer surface of the coupling short pipe and a tightener which engages with the tapered surface and contacts the coupling short pipe in the radius direction.

With this configuration, the joint side edges of the heating furnace tube element on one side and the heating furnace tube element on the other side can be surely contact with pressure with the coupling short pipe with a simple structure.

BRIEF DESCRIPTION OF THE DRAWINGS

FIG. 1 is a table on the result after examining coking resistance, high temperature oxidation resistance and mechanical characteristics of various compositions of alloys including rare earth ODS ferrous alloy of the heating furnace tube;

FIG. 3 is a table on the result after examining the influence of S on coking resistance for rare earth ODS ferrous alloy of the heating furnace tube and for austenitic heat resistant alloy of a conventional heating furnace tube;

BEST MODE FOR CARRYING OUT THE INVENTION

Figure 2:
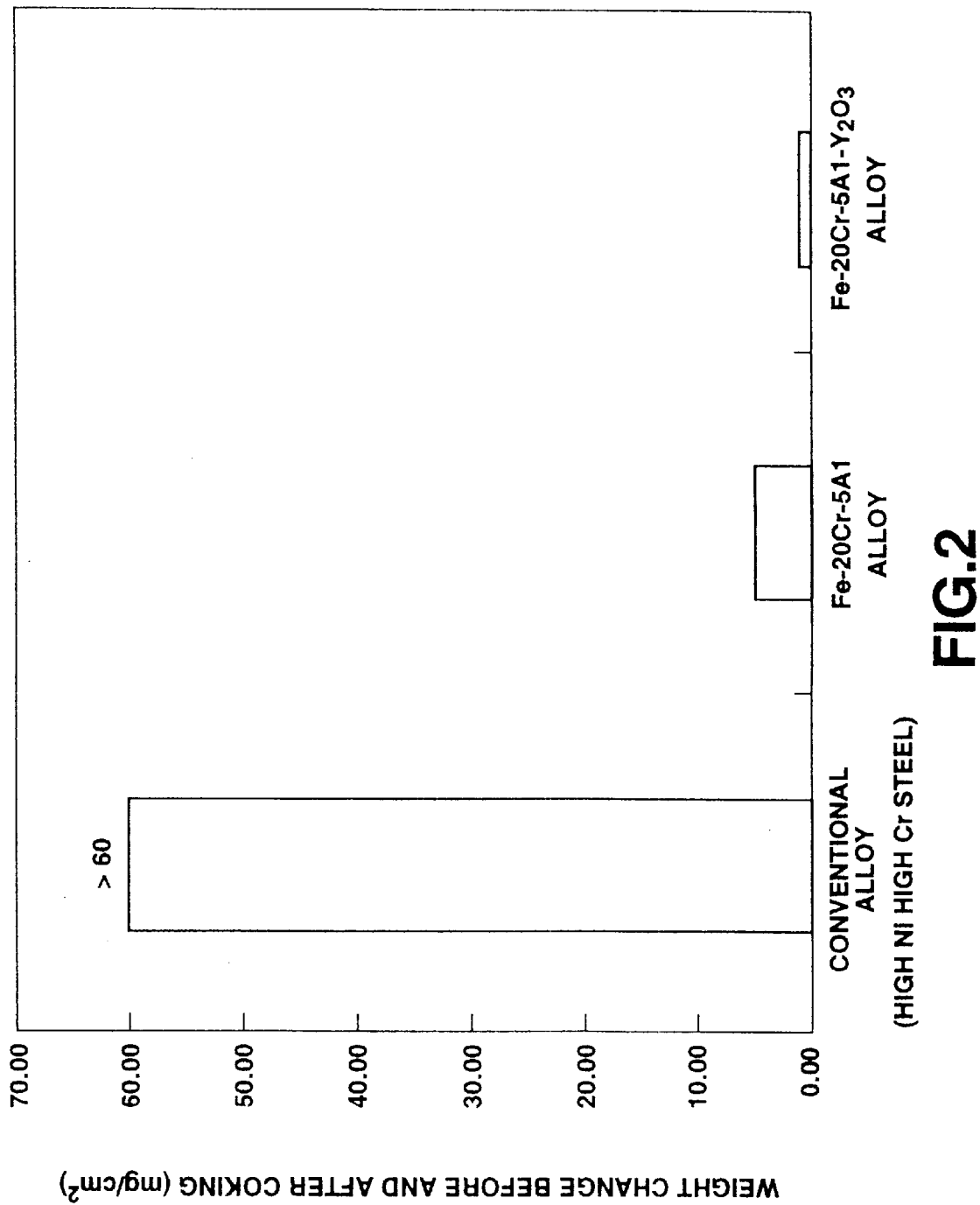
FIG. 2 is a graph which indicates the coking resistance comparison among Fe—20Cr—5 Al—$Y_2O_3$ alloy which is one of the materials of the heating furnace tube, austenitic heat resistant alloy, which is a conventional material, and Fe—20Cr—5 Al alloy.

Referring now to the drawings, best mode for carrying out the invention related to a heating furnace tube, a method of using the heating furnace tube, and a method of manufacturing the heating furnace tube is described.

In the drawings the same numerals and signs are used for the same components so as to omit redundant explanations.

A heating furnace tube related to the present invention is a heating furnace tube used to flow fluid containing hydrocarbon or carbon monoxide, such as a cracking tube of an ethylene plant, and is made of rare earth ODS ferrous alloy using Al-added ferritic high chrome ferrous alloy as a base, more particularly yttrium ODS ferrous alloy which contains 19–26% of Cr by weight and 3–6% of Al by weight.

FIG. 1 shows the result after examining coking resistance, higher temperature oxidation resistance and the mechanical characteristic (high temperature strength, ductility) for various compositions of alloys including yttrium ODS ferrous alloy used for the heating furnace tube of the present invention.

Coking resistance here was judged based on a known carbon precipitation test.

In other words, a sample (4×10×45 mm) for each alloy which surface has been finished with emery paper (600 grid) and has been oxidized under 950° C. steam is prepared, each sample is buried into a solid carburizer, is carburized at 1100° C., is oxidized in a 1100° C. atmosphere, and then coking and decoking are repeated 10 times, then weight changes before and after coking is checked for each sample, and coking resistance is judged depending on the degree of weight change.

Coking test has been conducted under the following conditions. Source gas: benzene (0.5 g/h), carrier gas: argon (16 Nml/min), adding quantity of S: 1 ppm or less, temperature: 800° C. and time: 8 hours.

High temperature oxidation resistance, high temperature strength and ductility are criteria to judge whether each alloy material can be practically used for a heating furnace tube considering state where the heating furnace tube is set, that is, the outer surface is heated by a burner, high temperature fluid flows through, and a mechanical strength sufficient enough to be a part of plant is required.

In FIG. 1, ⊚ indicates practically sufficient, ○ indicates possible, Δ indicates practically insufficient and * indicates impossible, and in the table of FIG. 1, the samples No. 8–No. 15, that is, yttrium ODS ferrous alloy which contains 19–26% of Cr by weight and 3–6% of Al by weight is suitable for a heating furnace tube in terms of coking resistance and other characteristics.

FIG. 2, on the other hand, shows the result of comparing austenitic heat resistant alloy (high Ni high Cr steel), Fe—20Cr—5Al alloy, and Fe—20Cr—5Al—$Y_2O_3$ alloy, which is one of the materials of the heating furnace tube of the present invention for coking resistance, more specifically weight change before and after coking.

While both high Ni high Cr steel and Fe—20Cr—5Al alloy are manufactured by melting process, Fe—20Cr—5Al—$Y_2O_3$ alloy of the heating furnace tube of the present invention is a dispersion-strengthened alloy manufactured by a powder metallurgy.

A sample (4×10×45 mm) for each alloy which surface has been finished with emery paper (600 grid) and has been oxidized under a 950° C. steam is prepared, each sample is buried into a solid carburizer, is carburized at 1100° C., is oxidized in a 1100° C. atmosphere, and then coking and decoking are repeated 10 times, then weight changes before and after coking is checked for each sample.

Coking test has been conducted under the following conditions. Source gas: benzene (0.5 g/h), carrier gas: argon (16 Nml/min), adding quantity of S: 1 ppm or less, temperature: 800° C. and time: 8 hours.

As shown in FIG. 2, the weight change before and after coking of Fe—20Cr—5—$Y_2O_3$ alloy of the heating furnace tube of the present invention is still less than Fe—20Cr—5Al alloy with excellent coking resistance, which make it clear that the addition of yttrium oxide to Fe—C—Al alloy contributes to a major improvement of coking resistance.

A comparison result between samples No. 5–No. 8 in FIG. 1 also shows that the addition of yttrium oxide to Fe—Cr—Al alloy contributes to a major improvement of coking resistance.

The table in FIG. 1 clearly shows that ferritic high chrome ferrous alloy which contains 19–26% of Cr by weight and 3–6% of Al by weight present a relatively good coking resistance, and particularly yttrium ODS ferrous alloy of samples No. 8–No. 15 causes extremely low weight changes before and after coking, approximately 1 mg/cm$^2$, indicating good coking resistance, as seen in Fe—20Cr—5Al—$Y_2O_3$ alloy in FIG. 2 compared with the high Ni High Cr steel and Fe—20Cr—5Al alloy.

Material which contains 28% or more Cr by weight and 8% or more Al by weight is low in ductility, more specifically in breaking elongation, and material which contains 14% or less Cr by weight is poor in oxidation resistance at a high temperature area, therefore both of these materials have problems in practical use as material for heating furnace tubes, and material where yttrium oxide has not been added is low in high temperature strength, therefore it is difficult to apply this material to actual heating furnace tubes.

Yttrium ODS ferrous alloys of samples No. 8–No. 15 where yttrium oxide has been added, on the other hand, have better coking resistance and high temperature strength, and as a result, it became clear that rare earth ODS ferrous alloy which contains 19–26% of Cr by weight and 3–6% of Al by weight is suitable for the material of heating furnace tubes.

The heating furnace tube related to the present invention is made of rare earth ODS ferrous alloy which contains 19–26% of Cr by weight and 3–6% of Al by weight, and the method of using the heating furnace tube related to the present invention is passing hydrocarbon or carbon monoxide through the heating furnace tube made of rare earth ODS ferrous alloy in the above mentioned composition.

And since rare earth ODS ferrous alloy which contains 19–26% of Cr by weight and 3–6% of Al by weight has extremely good coking resistance, as mentioned above, the heating furnace tube related to the present invention and the method of using the heating furnace tube related to the present invention can minimize the coking caused by operation of plant, and the interval of decoking can be extended much longer than conventional types.

The extension of the interval of decoking in this manner improves the productivity of plant considerably, and the economical effect of the present invention becomes enormous, including a decrease in cost for decoking, a decrease of thermal fatigue due to operation stops and restarts of the plant at decoking, and an increase of life.

In the case of cracking tubes of ethylene plant, where the tube wall temperature exceeds 1000° C., even reaching 1100° C. at some locations, accurate control is required for the operation of the plant with current austenitic heat resistant alloy, since the melting point is only about 150–200° C. higher than 1100° C., but if rare earth ODS ferrous alloy of the present invention which has the melting point of 1480° C. is used for heating furnace tubes, safety will further improve, and operation of plant will be even simpler.

Since the heating furnace tube of ethylene plant is extremely long, it is advisable to use the heating furnace tube related to the present invention only for locations where coking problems occur, using the heating furnace tube made of conventional materials for other locations, and connecting these tubes to construct an entire heating furnace tube from an economical point of view.

It is well known that adding S (sulfur) compound to fluid which flows through the heating furnace tube is effective to control coking.

FIG. 3 shows the result of examining the influence of S on coking resistance for rare earth ODS ferrous alloy of the heating furnace tube of the present invention, that is, rare earth ODS ferrous alloy which contains 19–26% of Cr by weight and 3–6% of Al by weight, and austenitic heat resistant alloy (25Cr–35Ni steel) of a conventional heating furnace tube.

Coking test has been conducted under the following conditions. Source gas: 10% methane+hydrogen, additive: DMS (dimethyl sulfide), 0 ppm, 200 ppm (S=100 ppm in atomic weight units), temperature: 900° C., 1000° C., 1100° C. and time: 5 hours.

FIG. 3 indicates a comparison of coking resistance depending on material, the amount of adding S compound, and temperature when the amount of weight change caused by coking of rare earth ODS ferrous alloy when S compound is added.

Under 900° C. and 1000° C. temperature conditions, weight change caused by coking is decreased by adding S compound for both the rare earth ODS ferrous alloy related to the present invention and austenitic heat resistant alloy which is the comparison material (conventional material), as the table in FIG. 3 shows.

Under a 1100° C. temperature condition, on the other hand, weight change caused by coking is decreased by adding S compound in the case of the rare earth ODS ferrous alloy related to the present invention, but weight change caused by coking tends to be increased by adding S compound in the case of austenitic heat resistant alloy, which is the comparison material (conventional material).

In this way, it is clear that adding 100 ppm of S in atomic weight units improves the coking resistance of both rare earth ODS ferrous alloy and austenitic heat resistant alloy under a 1000° C. or less temperature condition.

So in a heating furnace tube created by connecting the heating furnace tube of the present invention made of rare earth ODS ferrous alloy, and the heating furnace tube made of austenitic heat resistant alloy, good coking resistance is acquired by adding 100 ppm or less of S in atomic weight units to fluid that flows through the tube and by using the tube under a temperature condition of 1000° C. or less and 550° C. or more where the rare earth ODS ferrous alloy related to the present invention does not cause brittle fractures (at 475° C.), and as a consequence the heating furnace tube can be suitably used in a hydrocarbon environment where coking easily occurs.

Adding the amount of adding S exceeds 100 ppm (in atomic weight units) is not suitable for industrial purposes because problems related to corrosion and problems related to S removal in downstream process occur.

To add S (sulfur) to fluid that flows through the heating furnace tube, DMS (dimethyl sulfide) and DMDS (dimethyl disulfide) can be suitably used, and a sufficient effect can also be expected by adding hydrogen sulfide gas.

As described above, the cost of plant can be considerably decreased if the entire heating furnace tube of an ethylene plant is created by connecting the heating furnace tube related to the present invention made of rare earth ODS ferrous alloy and the heating furnace tube made of austenitic heat resistant alloy, in other words, using the heating furnace tube made of austenitic heat resistant alloy for part of the entire heating furnace tube.

If fluid containing 100 ppm or less of S in atomic weight units flows through the heating furnace tube constructed by connecting the heating furnace tube related to the present invention made of rare earth ODS ferrous alloy and a heating furnace tube made of austenitic heating resisting alloy, using the heating furnace tube in a 550° C. to 1000° C. temperature range, coking on rare earth ODS ferrous alloy and austenitic heat resistant alloy can be minimized, and therefore the interval of decoking can be extended much longer than conventional types.

The extension of the interval of decoking in this manner improves the productivity of plant considerably a decrease in cost for decoking, a decrease of thermal fatigue due to operation stops and restarts of the plant at decoking, and an increase of life.

Figure 4:
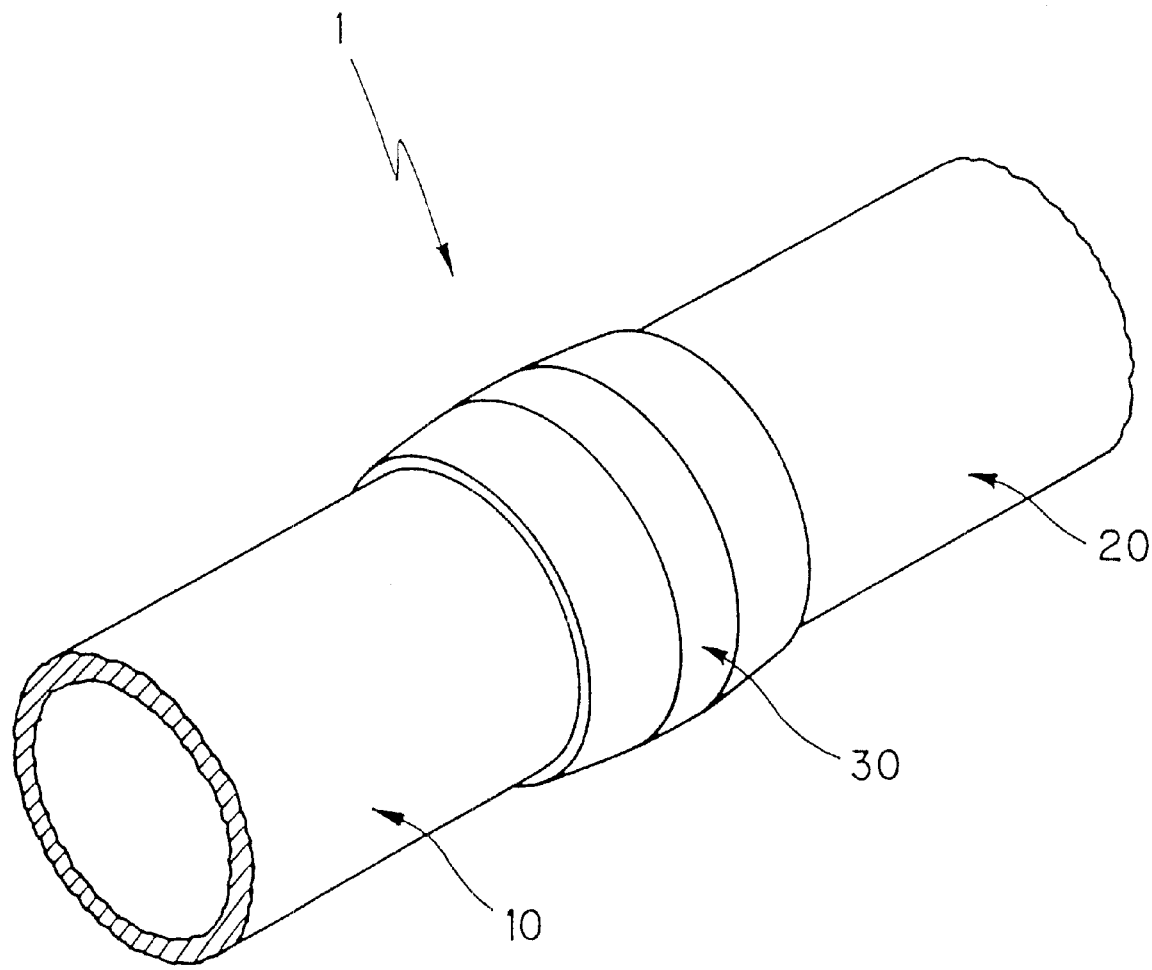
FIG. 4 is a perspective view of a first embodiment and showing the main portion of the heating furnace tube.
Figure 5:
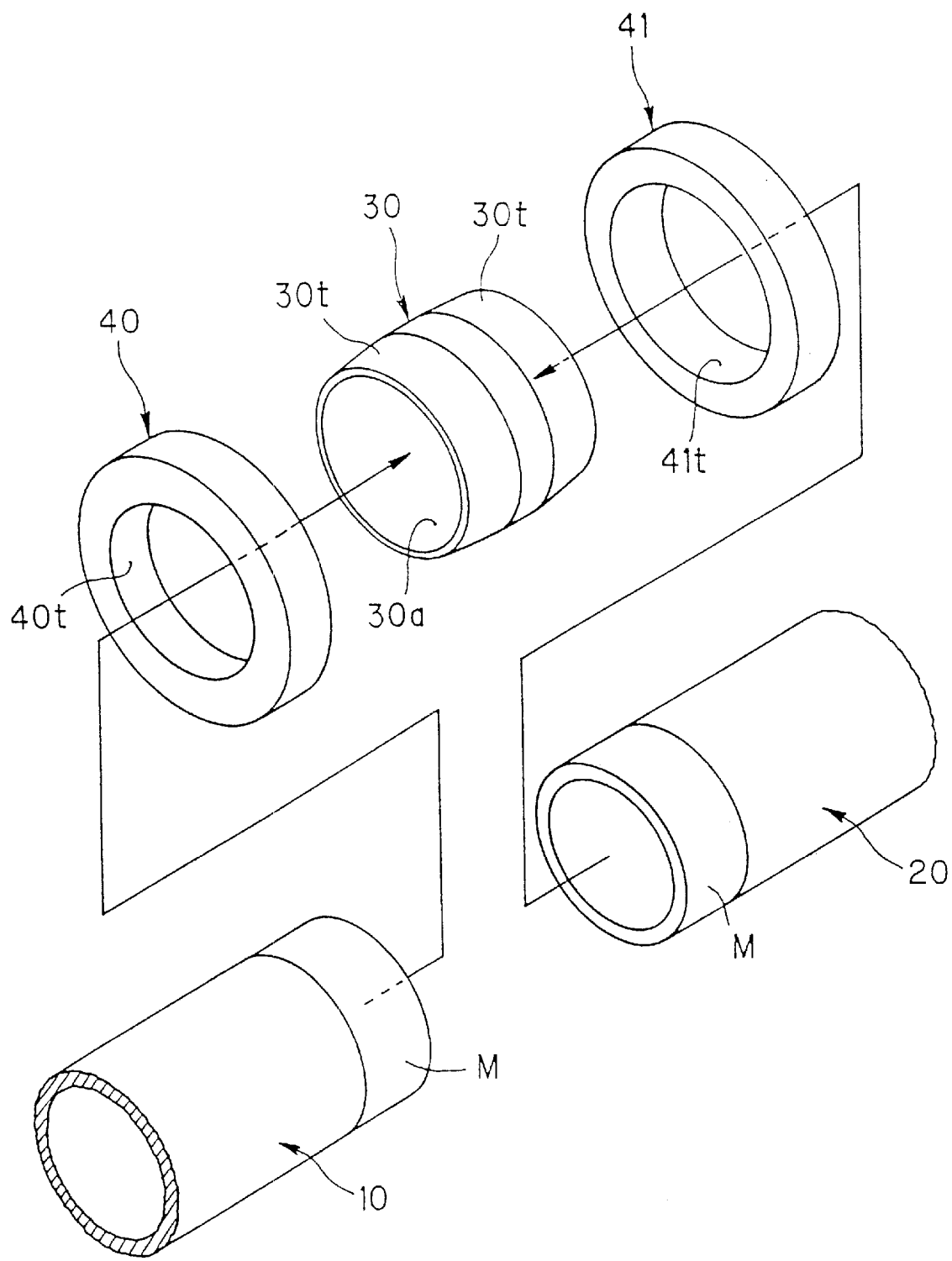
FIG. 5 is a perspective view depicting components and the tightener of the heating furnace tube of the embodiment shown in FIG. 4.
Figure 6:
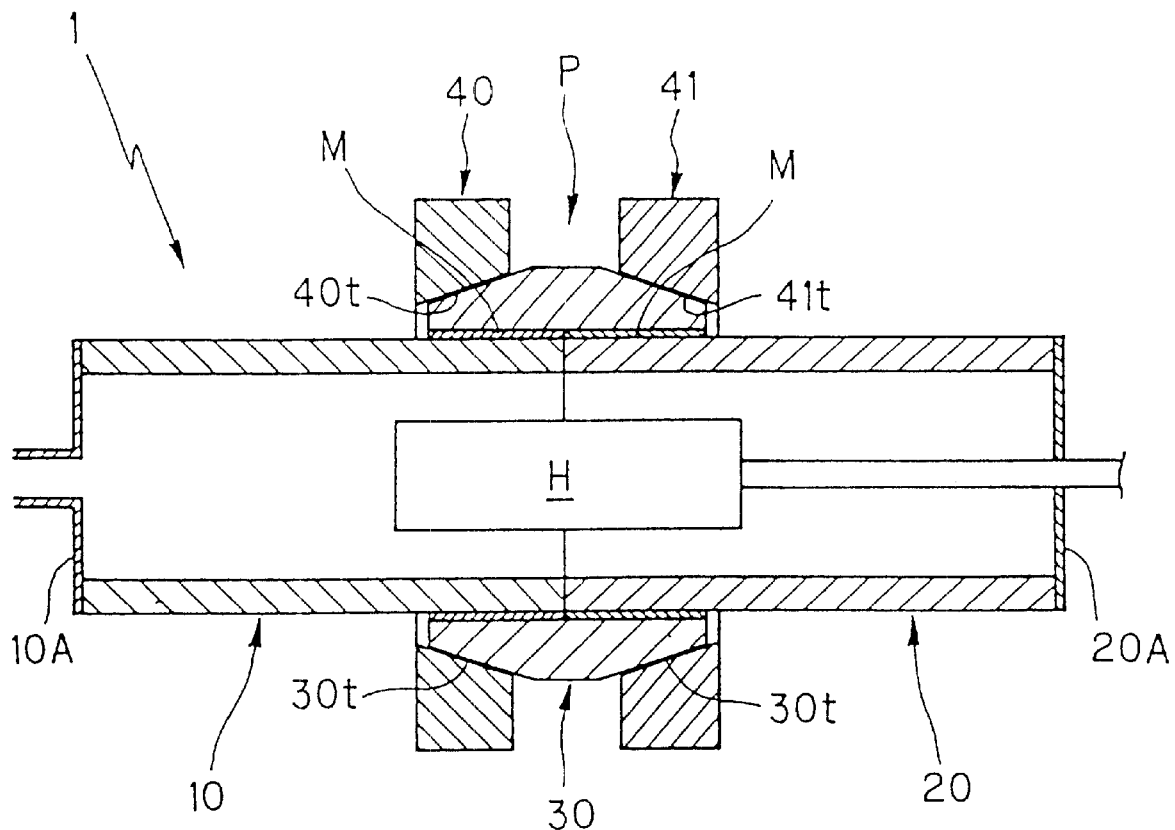
FIG. 6 is a cross-sectional side view of the main portion of the embodiment shown in FIG. 4 depicting the manufacturing mode of the heating furnace tube.

FIG. 4 to FIG. 6 show the heating furnace tube created by connecting the heating furnace related to the present invention and the heating furnace tube made of conventional material, and the method of manufacturing the heating furnace tube.

The heating furnace tube 1 shown in FIG. 4 is created by joining a heating furnace tube element 10 on one side made of the heating furnace tube related to the present invention made of rare earth ODS ferrous alloy which contains 19–26% of Cr by weight and 3–6% of Al by weight with the heating furnace tube element on the other side 20 made of austenitic heat resistant alloy, which are joined via insert metal by diffusion bonding.

The heating furnace tube element on one side 10 and the heating furnace tube element on the other side 20 of the heating furnace tube 1 are joined via the coupling short pipe 30 made of austenitic heat resistant alloy which is the same material as the heating furnace tube element on the other side 20.

For the heating furnace tube element on the other side 20, not only austenitic heat resistant alloy but also rare earth ODS ferrous alloy which is the same material as the heating furnace tube element on one side 10 can be used.

For the coupling short pipe 30 as well, not only the above mentioned austenitic heat resistant alloy but also rare earth ODS ferrous alloy which is the same material as the heating furnace tube element on one side 10 can be used.

The above-described heating furnace tube 1 is manufactured by the following processes.

At first, the outer surface of the joint side edges of the heating furnace tube element on one side 10 (outer diameter: 70 mm, wall thickness: 5 mm) and the heating furnace tube element on the other side 20 which size is the same as the heating furnace tube element on one side 10 (outer diameter: 70 mm, wall thickness: 5 mm) are ground in a 30 mm range from the edge of the respective tube component to be a surface roughness of 25 S.

Then Ni—4% B alloy film M used as insert metal is formed to 50 µm thick by electroplating on the outer surface of the joint side edge of the heating furnace tube element on one side 10, and on the outer surface of the joint side edge of the heating furnace tube element on the other side 20, which are finished as above.

For the insert metal, a regular amorphous metal product, such as Bni metal for brazing, can be used.

Then the joint side edge of the heating furnace tube element on one side 10 and the joint side edge of the heating furnace tube element on the other side 20 are inserted to each edge of the coupling short pipe 30 for 30 mm respectively.

Here, the coupling short pipe 30 has a 70-mm internal diameter, 8-mm wall thickness, and 60-mm length, and the inner surface 30a has been finished to a 25 S surface roughness.

Both ends of the outer surface of the coupling short pipe 30 have approximately 10° of tapered surfaces 30t and 30t where the diameter decreases toward the edge.

It is possible to form the film of insert metal not only on the joint side edges of the above mentioned heating furnace tube elements 10 and 20, but also on the inner surface 30a of the above mentioned coupling short pipe 30, and it is also possible to form the film of insert metal only on the inner surface of the above mentioned coupling short pipe 30.

After inserting the joint side edge of the heating furnace tube element on one side 10 and the joint side edge of the heating furnace tube element on the other side 20 to the coupling short pipe 30 respectively, the coupling short pipe 30 is contacted in the radius direction by the tighteners 40 and 41 attached to each tapered surface 30t and 30t of the coupling short pipe 30, so that the joint side edges of the heating furnace tube elements 10 and 20 and inner surface 30a of the coupling short pipe 30 are pressed sandwiching the plating layers M and M of the insert metal, and are contact with pressure for joining.

The tighteners 40 and 41 here have a ring shape respectively, of which the inner surface has tapered surface 40t and 41t, similar to the tapered surface 30t and 30t of the above mentioned coupling short pipe 30, and the coupling short pipe 30 is contacted in the radius direction by moving the tighteners attached to each tapered surface 30t and 30t of the coupling short pipe 30 in the direction where they approach each other.

The pressurization means P to contact with pressure the coupling short pipe 30 to the heating furnace tube element on one side 10 and the heating furnace tube element on the other side 20 is made of the tapered faces 30t and 30t of the above mentioned coupling short pipe 30 and the above mentioned tighteners 40 and 41.

After joining the heating furnace tube element on one side 10 and the heating furnace tube element on the other side 20 with the coupling short pipe 30, the inside of each heating furnace tube element 10 and 20 is exhausted until the degree of vacuum becomes 0.001 Torr or less.

10A and 20A of FIG. 6 are barrier plates attached to seal openings of the edges of the heating furnace tube elements 10 and 20 when the inside of each one of the heating furnace tube elements 10 and 20 is exhausted.

Exhausting inside each one of the heating furnace tube elements 10 and 20 prevents oxidation of the film M of the insert metal, and allows checking the joining state between each one of the heating furnace tube elements 10 and 20 and the coupling short pipe 30.

Joining each one of the heating furnace tube elements 10 and 20 via the coupling short pipe 30 makes centering (aligning center axis) of the heating furnace tube element on one side 10 and the heating furnace tube element on the other side 20 easier, and implements air tightness inside and outside each heating furnace tube elements 10 and 20 .

It is acceptable to fill inert gas inside each one of the heating furnace tube element 10 and 20 after exhausting to prevent oxidation of the film M of insert metal, and it is also acceptable to fill inert gas inside each one of the heating furnace tube element 10 and 20 without exhausting.

After exhausting inside each one of the heating furnace tube element 10 and 20, a heater H inserted in the above mentioned heating furnace tube elements 10 and 20 increase the temperature by induction heating up to the temperature at which the film M of the insert metal melts, and this temperature is held for one hour to progress diffusion bonding (liquid phase diffusion bonding).

It is also possible to melt the film M of insert metal and progress diffusion bonding by infrared heating, instead of using induction heating.

When each one of the heating furnace tube elements 10 and 20 is heated from inside, each heating furnace tube element 10 and 20 thermally expands in the radius direction, which prevents a drop of joining pressure between each heating furnace tube element 10 and 20 and the coupling short pipe 30 during heating along with the joining force by the above mentioned pressurization means P.

After diffusion bonding is completed by holding high temperature for one hour, heating furnace tube 1 is cooled down to room temperature, then the tighteners 40 and 41 are removed from the coupling short pipe 30 and the manufacturing process of the heating furnace tube 1 ends.

As FIG. 4 shows, the completed heating furnace tube 1 has an appearance that the coupling short pipe 30 is attached at the connection part between the heating furnace tube element on one side 10 and the heating furnace tube element on the other side 20.

In the case of the heating furnace tube 1 that has the above mentioned configuration, the cost of plant can be considerably decreased by using the heating furnace tube element on the other side 20 which is partially made of austenitic heating resisting alloy.

If the heating furnace tube 1 that has the above mentioned configuration allows fluid containing 100 ppm or less of S in atomic weight units to flow through and is used in a 550° C. to 1000° C. temperature range, coking at the heating furnace tube element on one side 10 made of rare earth ODS ferrous alloy and at the other heating furnace tube element on the other side 20 made of austenitic heat resistant alloy can be minimized, and as a consequence the interval of decoking can be extended much longer than a conventional heating furnace tube, which generates enormous high economical effect.

Needless to say, the heating furnace tube related to the present invention and the method of using the heating furnace tube related to the present invention can be effectively applied not only to the cracking tubes of an ethylene plant, but also to various heating furnace tubes which are subject to coking problems, such as CCR plant in a petroleum refining plant.

The heating furnace tube related to the present invention of which one objective is to solve the problem of carburization is also manufactured by exactly the same process as the heating furnace tube 1 shown in FIG. 4 to FIG. 6.

Figure 7:
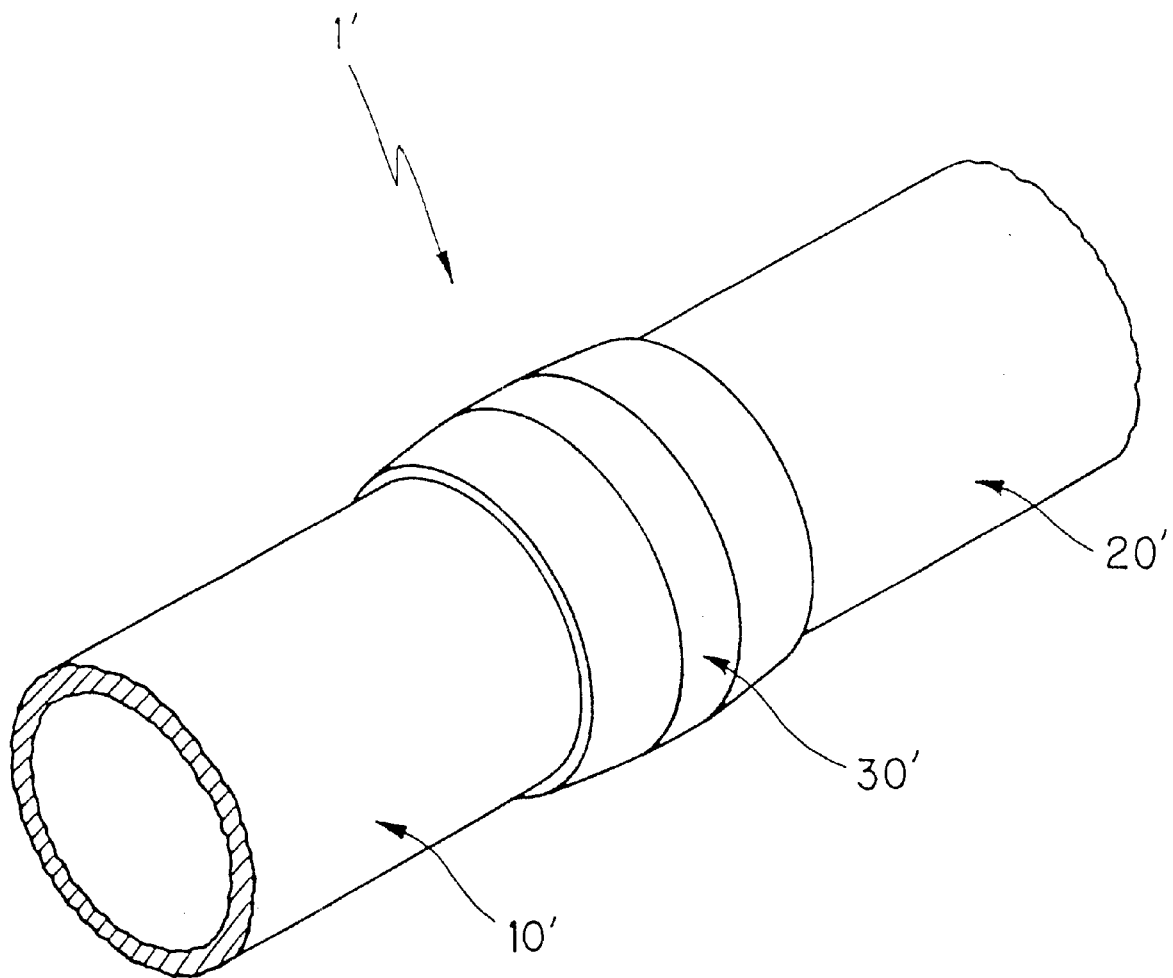
FIG. 7 is a perspective view of a second embodiment and showing the main portion of the heating furnace tube.
Figure 8:
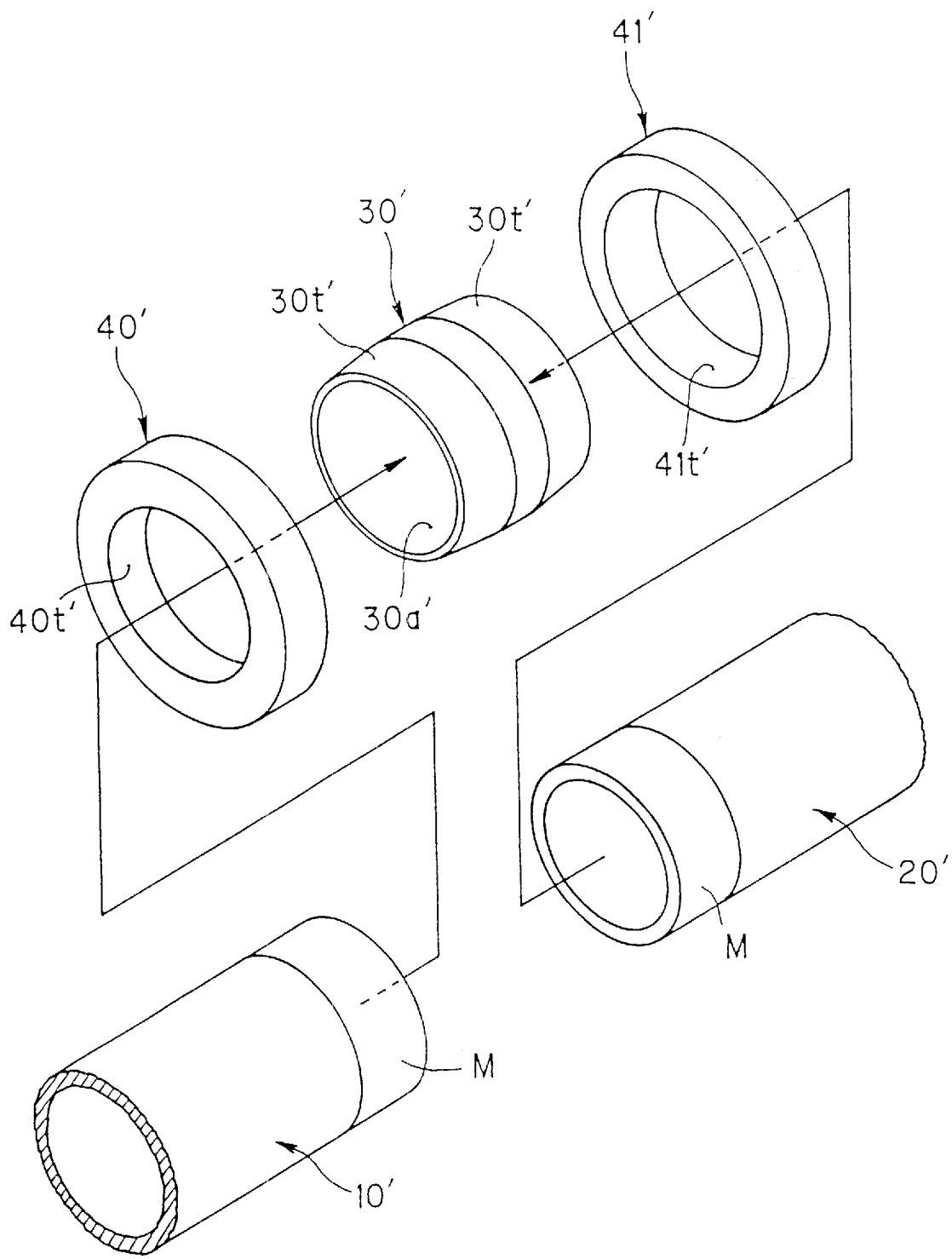
FIG. 8 is a perspective view depicting components and the tightener of the heating furnace tube of the embodiment shown in FIG. 6.
Figure 9:
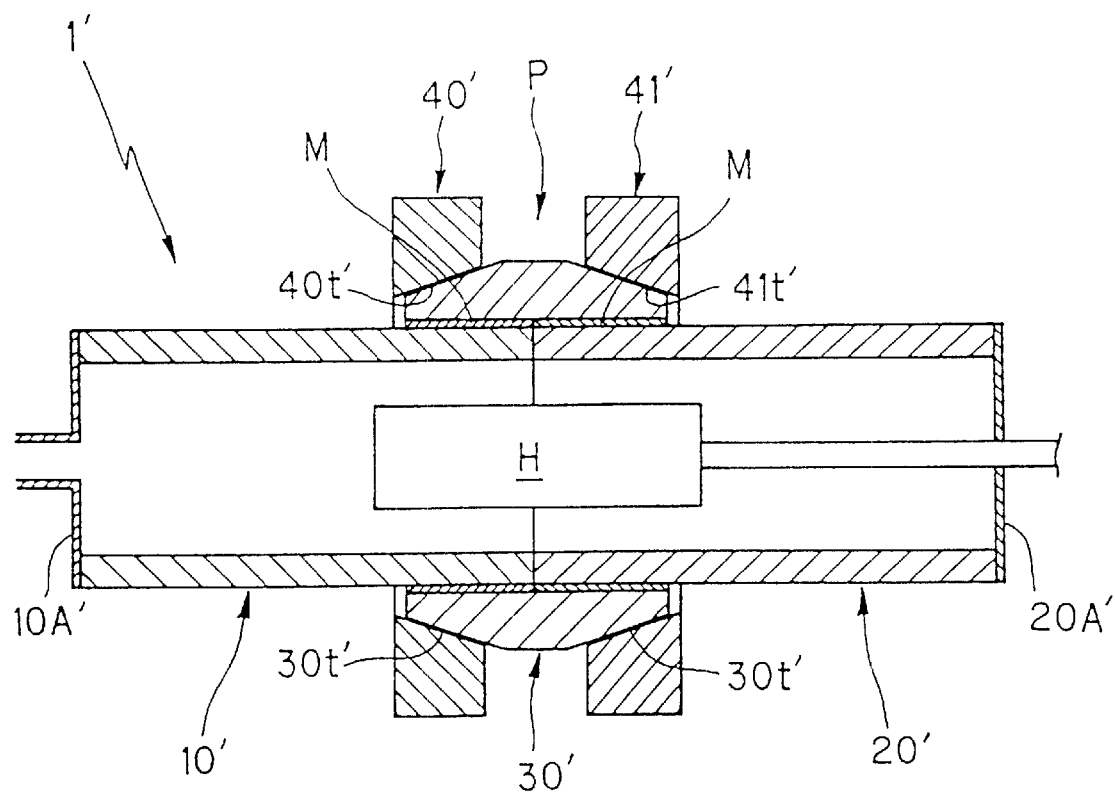
FIG. 9 is a cross-sectional side view depicting the manufacturing mode of the heating furnace tube of the embodiment shown in FIG. 6.

As FIG. 7 to FIG. 9 show, the heating furnace tube 1' related to the present invention is created by joining the heating furnace tube element on one side 10' made of yttrium ODS ferrous alloy which contains 20% of Cr by weight and 4.5% of Al by weight, and the heating furnace tube element on the other side 20' made of austenitic heat resistant alloy (25Cr—35Ni—Fe) by diffusion bonding via insert metal.

The above mentioned heating furnace tube 1' has a coupling short pipe (intermediate member) 30' made of an austenitic heat resistant alloy (25Cr—35Ni—Fe) which is the same material as the heating furnace tube element on the other side 20', and the heating furnace tube element 10' on one side and the heating furnace tube element on the other side 20' are joined via the above mentioned coupling short pipe 30'.

For the heating furnace tube element on the other side 20', not only austenitic heat resistant alloy tube, such as Hpmod centrifugal casting tube, Sumitomo Metal HPM, and Inco Alloy 803, but also ODS ferrous alloy tube which has the same material as the heating furnace tube element on one side 10' can be used.

For the coupling short pipe 30', not only the above mentioned austenitic heat resistant alloy tube but also an ODS ferrous alloy tube which has the same material as the heating furnace tube element on one side 10' and ferritic heat resistant alloy tube can be used.

The above mentioned heating furnace tube 1' is manufactured through the following processes.

At first, the outer surface of the joint side edges of the heating furnace tube element on one side 10' (outer diameter: 70 mm, wall thickness: 5 mm) and the heating furnace tube element on the other side 20' which size is the same as the heating furnace tube element on one side 10' (outer diameter: 70 mm, wall thickness: 5 mm) are ground in a 30 mm range from the edge of the respective tube component to be a surface roughness of 25 S.

Then Ni—4% B alloy film M used as insert metal is formed to 5 μm thick by electroplating on the outer surface of the joint side edge of the heating furnace tube element on one side 10' and the outer surface of the joint side edge of the outer heating furnace tube element on the other side 20', which are finished as above.

For insert metal, a regular amorphous metal product, such as Bni metal for grazing, can be used.

Then the joint side edge of the heating furnace tube element on one side 10' and the joint side edge of the heating furnace tube element on the other side 20' are inserted to each edge of the coupling short pipe 30' for 30 mm respectively.

Here the coupling short pipe 30' has a 70-mm inner diameter, an 8-mm wall thickness and 60-mm length, and the inner surface 30a' has been finished to be a 25 S surface roughness.

Both ends of the outer surface of the coupling short pipe 30' have approximately 10° of tapered surfaces 30t' and 30t' where the diameter decreases toward the edge.

It is possible to form the film of the insert metal not only on the joint side edges of the above mentioned heating furnace tube elements 10' and 20', but also on the inner surface 30a' of the above mentioned coupling short pipe 30', and it is also possible to form the film of the insert metal only on the inner surface of the above mentioned coupling short pipe 30'.

After inserting the joint side edge of the heating furnace tube element on one side 10' and the joint side edge of the heating furnace tube element on the other side 20' to the coupling short pipe 30' respectively, the coupling short pipe 30' is contacted in the radius direction by the tighteners 40' and 41' attached to each tapered surface 30t' and 30t' of the coupling short pipe 30', so that the joint side edges of the heating furnace tube elements 10' and 20' and the inner surface 30a' of the coupling short pipe 30' are pressed sandwiching the plating layers M and M of the insert metal, and are contact with pressure for joining.

The tighteners 40' and 41' here have a ring shape respectively, of which the inner surface has tapered surface 40t' and 41t' similar to the tapered surfaces 30t' and 30t' of the above mentioned coupling short pipe 30', and the coupling short pipe 30' is contacted in the radius direction by moving the tighteners attached to each tapered surface 30t' and 30*t'* of the coupling short pipe 30' in the direction where they approach each other.

The pressurization means P to contact with pressure the coupling short pipe 30' to the heating furnace tube element on one side 10' and the heating furnace tube element on the other side 20' is made of the tapered faces 30*t'* and 30*t'* of the above mentioned coupling short pipe 30' and the above mentioned tighteners 40' and 41'.

After joining the heating furnace tube element on one side 10' and the heating furnace tube element on the other side 20' with the coupling short pipe 30, the inside of each heating furnace tube element 10' and 20' is exhausted until the degree of volume becomes 0.001 Torr or less.

10A' and 20A' in FIG. 9 are barrier plates attached to seal openings of the edges of the heating furnace tube elements 10' and 20' when the inside of each one of the heating furnace tube elements 10' and 20' is exhausted.

Exhausting inside each one of the heating furnace tube element 10' and 20' prevents, oxidation of the film M of the insert metal, and allows checking the joining state between each one of the heating furnace tube elements 10' and 20' and the coupling short pipe 30'.

Joining each one of the heating furnace tube elements 10' and 20' via the coupling short pipe 30' makes centering (aligning center axis) of the heating furnace tube element on one side 10' and the heating furnace tube element on the other side 20' easier and implements air tightness inside and outside each heating furnace tube element 10' and 20'.

It is acceptable to fill inert gas inside each one of the heating furnace tube element 10' and 20' after exhausting to prevent oxidation of the film M of the insert metal, and it is also acceptable to fill inert gas inside each one of the heating furnace tube element 10 and 20 without exhausting.

After exhausting the inside of each one of the heating furnace tube element 10' and 20', a heater H inserted in the above mentioned heating furnace tube elements 10' and 20' increases the temperature by induction heating up to the temperature at which the film M of the insert metal melts, and this temperature is held for one hour to progress diffusion bonding (liquid phase diffusion bonding).

It is also possible to melt the film M of insert metal and progress diffusion bonding by infrared heating, instead of induction heating.

When each one of the heating furnace tube elements 10' and 20' is heated from the inside, each heating furnace tube element 10' and 20' thermally expands in the radius direction, which prevents a drop of joining pressure between each heating furnace tube element 10' and 20' and the coupling short pipe 30' during heating along with the joining force by the above mentioned pressurization means P.

After diffusion bonding is completed by holding high temperature for one hour, the heating furnace tube 1' is cooled down to room temperature, then the tighteners 40' and 41' are removed from the coupling short pipe 30', and the manufacturing process of the heating furnace tube 1' ends.

As FIG. 7 shows, the completed heating furnace tube 1' has an appearance that the coupling short pipe on one side 30' is attached at the connection part between the heating furnace tube element on one side 10' and the heating furnace tube element on the other side 20'.

It has been confirmed that the heating furnace tube 1' manufactured in this way has a practically sufficient performance where the joint section can endure a 100 barometric pressure during hydraulic tests.

In the heating furnace tube 1' manufactured through the above mentioned processes, at least the heating furnace tube element on the one side 10' is made of yttrium ODS ferrous alloy which has good carburization resistance, therefore the interval of heating furnace tube replacement can be extended longer than a conventional heating furnace tube.

This brings out a considerable economical effect since the expense of replacing heating furnace tubes can be decreased, and an extension of the interval of operations stops of the plant due to carburization depth measurement prevents a drop in productivity, and an extension of the interval of operation stops of the plant due to carburization depth measurement also decreases thermal fatigue caused by the stop in furnace operation and restart of operation, which extends the operating life of the plant.

The strength of the joint section of each heating furnace tube element 10' and 20' of the heating furnace tube 1' is lower than an ODS ferrous alloy tube and an austenitic heat resistant alloy tube which are base materials.

The high temperature strength and the carburization resistance of an austenitic heat resistant alloy tube, which is used for a part of the heating furnace tube 1', is lower than those of an ODS ferrous alloy tube, and it is known that an ODS ferrous alloy tube also exhibits an embrittlement phenomena, depending on the operating temperature range.

As a result, experiments were conducted in terms of structural change and carburization resistance to confirm the optimum operating temperature range of the heating furnace tube 1', and the following results were obtained.

| Joint | Structural change | Carburization resistance |
|---|---|---|
| ODS ferrous alloy/ ODS ferrous alloy | 475° C. brittleness | 1200° C. or less |
| ODS ferrous alloy/ ferritic heat resistant alloy | 475° C. brittleness | 1100° C. or less |
| ODS ferrous alloy/ austenitic heat resistant alloy | 475° C. brittleness | 1100° C. or less |

For an evaluation of carburization resistance, a specimen was set in a quartz tube and heated in an electric furnace where hydrogen and methane gas flowed through, then the weight change of the specimen was measured. As the above result shows, the operating temperature range of the heating furnace tube 1' should be set to 550° C. or more where 475° C. embrittlement does not occur, and to 1200° C. or less where carburization resistance is sufficient.

In other words, using the heating furnace tube 1' in a 550° C. to 1200° C. temperature range prevents brittle fractures caused by 475° C. embrittlement and implements sufficient carburization resistance.

In the case of a conventional heating furnace tube made of austenitic heat resistant alloy, on the other hand, considerable carburization occurs in a temperature range that exceeds 1100° C.

This carburization problem can be solved by using ODS ferrous alloy tubes for all the heating furnace tube elements located near a 1100° C. temperature environment, and using austenitic heat resistant alloy tubes for heating furnace tube elements located near a 1000° C. temperature environment, such as the exit of the furnace.

In this way, the heating furnace tube and the method of manufacturing the heating furnace tube related to the present invention allows using different materials for heating furnace tube elements depending on the operating temperature conditions, and especially using an austenitic heat resistant alloy tube for a part of the heating furnace tube can decrease plant cost.

Figure 10:
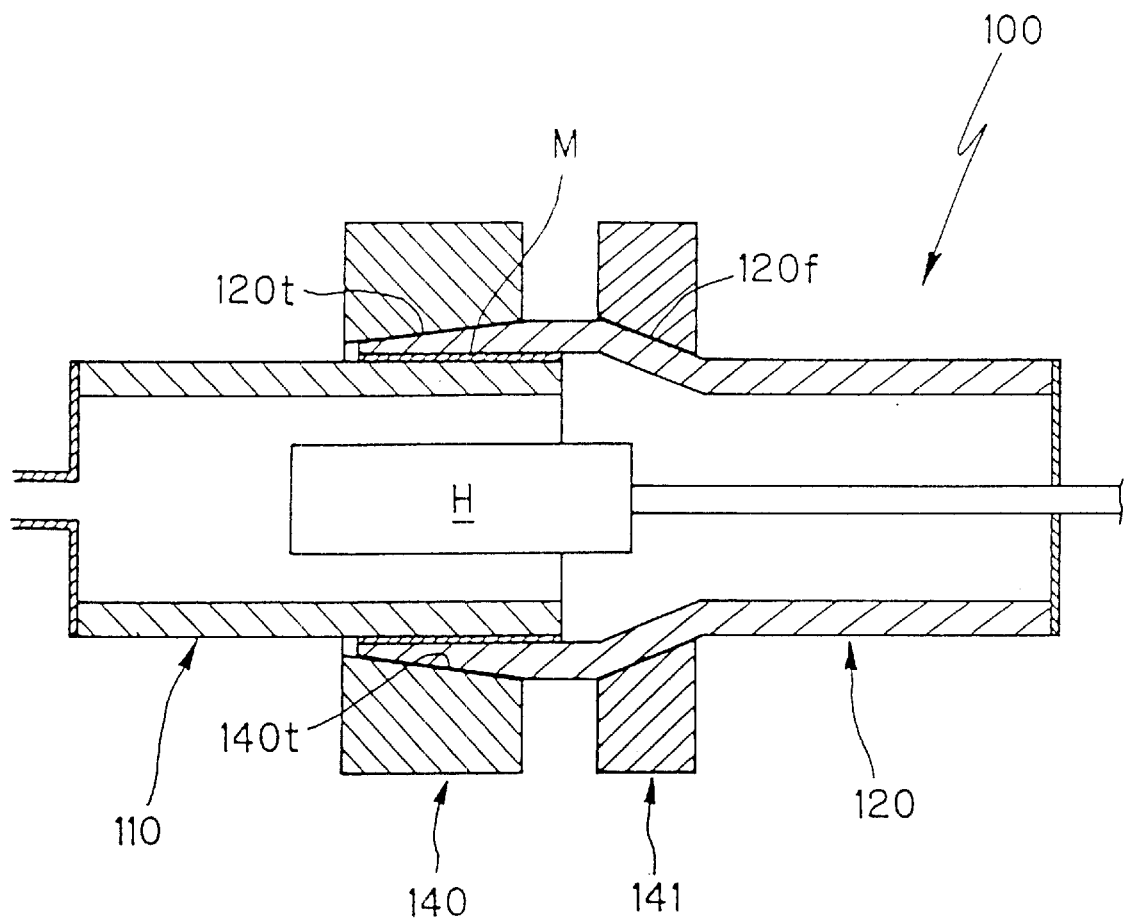
FIG. 10 is a cross-sectional side view of the main portion depicting a third embodiment of the heating furnace tube.

The heating furnace tube 100 in FIG. 10 is made of the heating furnace tube element on one side 110 made of an ODS ferrous alloy tube and the heating furnace tube element on the other side 120 made of an austenitic heat resistant alloy which are joined via insert metal by diffusion bonding.

For the heating furnace tube element on the other side 120, not only an austenitic heat resistant alloy tube but also an ODS ferrous alloy tube which is the same material as the heating furnace tube element on one side 110 can be used.

Film M of insert metal is formed on the outer surface of the joint side edge of heating furnace tube element on one side 110 and the joint side edge of the heating furnace tube element on the other side 120 is expanded so as to engage with the joint side edge of the heating furnace tube element on one side 110.

To manufacture the heating furnace tube 100, the joint side edge of the heating furnace tube element on one side 110 is engaged with the joint side edge of the heating furnace tube element on the other side 120 first, then the tightener 140 of which the inner surface has the tapered surface 140*t* is attached to the tapered surface 120*t* of the heating furnace tube element on the other side 120, and a stopper block 141 is attached to the section 120*f* of the heating furnace tube element on the other side 120 where the diameter increases.

Then the joint side edge of the heating furnace tube element on the other side 120 is contact with pressure to the joint side edge of the heating furnace tube element on one side 110 sandwiching the plate layer M of the insert metal, then diffusion bonding is progressed by exhausting, increasing temperature, and by holding the high temperature, in the same manner as the manufacturing process of the above mentioned heating furnace tube 1', and the tube is cooled down to room temperature after diffusion jointing completes, then the tightener 140 and the stopper block 141 are removed and the manufacturing process of the heating furnace tube 100 ends.

The film M of the insert metal can be formed not only on the heating furnace tube element on one side 110 but also on the inner surface of the heating furnace tube element on the other side 120, and can be formed only on the heating furnace tube element on the other side 120.

Needless to say, the heating furnace tube 100 with the above mentioned configuration also generates an effect equivalent to the above mentioned heating furnace tube 1'.

In the case of the above mentioned heating furnace tube 100, where the heating furnace tube element on one side 110 and the heating furnace tube element on the other side 120 are directly jointed via insert metal by diffusion bonding, the coupling short pipe as intermediate member used for the above mentioned heating furnace tube 1' is unnecessary.

Figure 11:
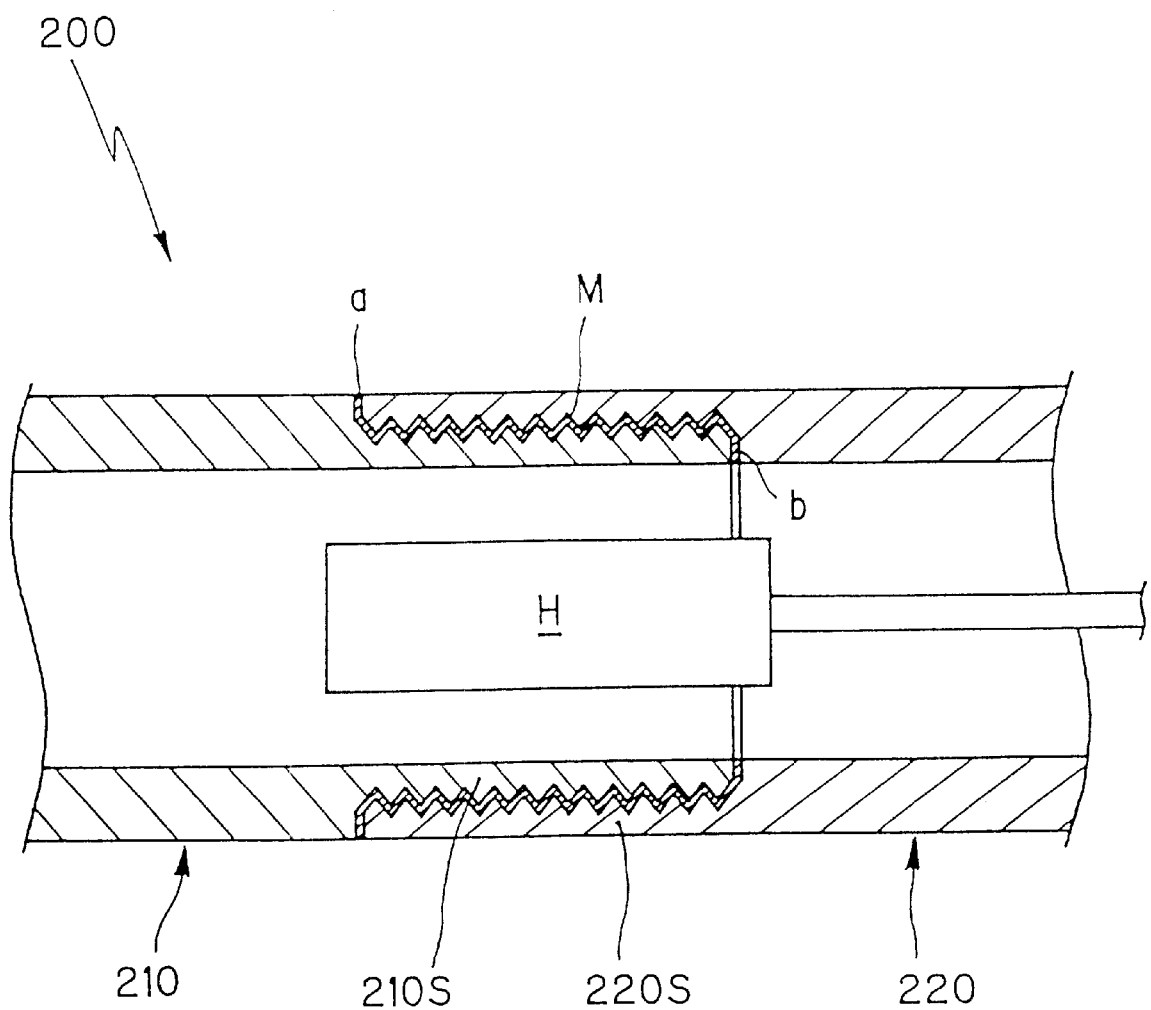
FIG. 11 is a cross-sectional side view of the main portion depicting a fourth embodiment of the heating furnace tube.

The heating furnace tube 200 in FIG. 11 is made of the heating furnace tube element on one side 210 made of an ODS ferrous alloy tube and the heating furnace tube element on the other side 220 made of an austenitic heat resistant alloy tube which are joined via insert metal by diffusion bonding.

For the heating furnace tube element on the other side 220, not only an austenitic heat resistant alloy tube but also an ODS ferrous alloy tube which is the same material as the heating furnace tube element on one side 210 can be used.

A male screw 210S is on the joint side edge of the heating furnace tube element on one side 210 and a female screw 220S is on the heating furnace tube element on the other side 220, and film M of the insert metal is formed on the outer surface of the joint side edge of the heating furnace tube element on one side 210 for the entire joining surface with the heating furnace tube element on the other side 220, by electroplating.

To manufacture the heating furnace tube 200, the male screw 210S on the heating furnace tube element on one side 210 and the female screw 220S on the heating furnace tube element on the other side 220 are screwed together to mechanically join each heating furnace tube element 210 and 220, and the joint side edges of the heating furnace tube elements 210 and 220 are contact with pressure sandwiching the plate layer M of the insert metal, then diffusion bonding is progressed by exhausting, increasing temperature, and holding the high temperature, in the same matter as the manufacturing process of the above mentioned heating furnace tube 1', then the tube is cooled down to room temperature after diffusion bonding completes, and the manufacturing process of the heating furnace tube 200 ends.

The film M of the insert metal M can be formed not only on the heating furnace tube element on one side 210 but also on the heating furnace tube element on the other side 220, and can be formed only on the heating furnace tube element on the other side 220.

The female screw can be on the heating furnace tube element on one side 210, and the male screw on the heating furnace tube element on the other side 220.

A circular insert ring made of insert metal can be attached at the joint sections a and b of each one of the heating furnace tube elements 210 and 220.

Needless to say, the heating furnace tube 200 with the above mentioned configuration also generates an effect equivalent to the above mentioned heating furnace tube 1'.

In the case of the above mentioned heating furnace tube 200, where the eating furnace tube element on one side 210 and the heating furnace tube element on the other side 220 are directly joined via insert metal by diffusion bonding, the coupling short pipe as intermediate member used for the above mentioned heating furnace tube 1' is unnecessary.

Also in the above mentioned heating furnace tube 200, mechanical strength and air tightness in a high temperature environment can be implemented by combining mechanical joining by screwing and diffusion bonding.

Figure 12:
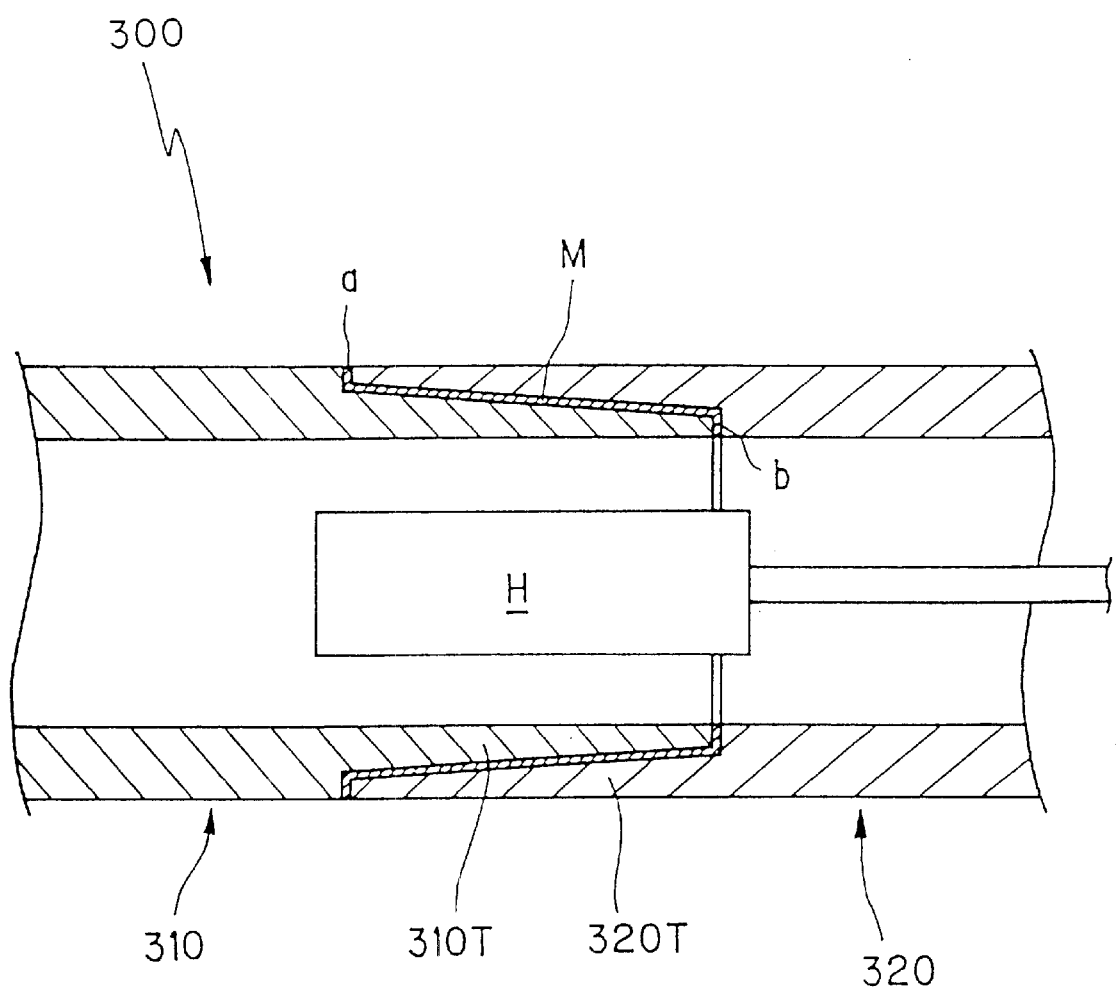
FIG. 12 is a cross-sectional side view of the main portion depicting a fifth embodiment of the heating furnace tube.

The heating furnace tube 300 in FIG. 12 is made of the heating furnace tube element on one side 310 made of an ODS ferrous alloy tube and the heating furnace tube element on the other side 320 made of an austenitic heat resistant alloy tube which are joined via insert metal by diffusion bonding.

For the heating furnace tube element on the other side 320, not only an austenitic heat resistant alloy tube but also an ODS ferrous alloy tube which is the same material as the heating furnace tube element on one side 310 can be used.

A tapered shaped convex engaging section 310T is on the joint side edge of the heating furnace tube element on one side 310, and a tapered shaped concave engaging section 320T is on the joint side edge, of the heating furnace tube element on the other side 320, and film M of insert metal is formed on the outer surface of the joint side edge of the heating furnace tube element on one side 310, for the entire joining surface with the heating furnace tube element on the other side 320 by electroplating To manufacture the heating furnace tube 300, the convex engaging section 310T on the heating furnace tube element on one side 310 and the concave engaging section 320T on the heating furnace tube element on the other side 320 are engaged to mechanically join each one of the heating furnace tube element 310 and 320, and the joint side edges of the heating furnace tube elements 310 and 320 are contact with pressure sandwiching the plate layer M of insert metal by applying 0.1 kg/mm$^2$ or more compression stress in the tube axis direction of each heating furnace tube element 310 and 320.

Then diffusion bonding is progressed by exhausting, increasing temperature and holding the temperature in the same manner as the manufacturing process of the above mentioned heating furnace tube 1', then the tube is cooled down to room temperature after diffusion bonding completes, and the manufacturing process of the heating furnace tube 300 ends.

The film M of insert metal can be formed not only on the heating furnace tube element on one side 310 but also on the heating furnace tube element on the other side 320, and can be formed only on the heating furnace tube element on the other side 320.

The concave engaging section can be on the heating furnace tube element on one side 310, and the convex engaging section can be on the heating furnace tube element on the other side 320.

A circular insert ring made of insert metal can be attached at the joint sections a and b of each one of the heating furnace tube elements 310 and 320.

Needless to say, the heating furnace tube 300 with the above mentioned configuration also generates an effect equivalent to the above mentioned heating furnace tube 1'.

In the case of the above mentioned heating furnace tube 300, where the heating furnace tube element on one side 310 and the heating furnace tube element on the other side 320 are directly joined via insert metal by diffusion bonding, and the coupling short pipe as intermediate member used for the above mentioned heating furnace tube 1' is unnecessary.

Also in the above mentioned heating furnace tube 300, mechanical strength and air tightness in a high temperature environment can be implemented by combining mechanical joining by a tapered joint and diffusion bonding.

The film M of insert metal used in each one of the above mentioned embodiments is formed by electroplating, but wet plating, dry plating, electroless plating, physical deposition (e.g. vacuum deposition, sputtering, ion plating) and vapor plating, including chemical deposition (e.g. high temperature CVD, plasma CVD), spraying and coating metal paste and other methods can be used to form the film M of insert metal.

It is also possible to insert metal, specifically tubular or circular insert material made of a thin plate of insert metal or insert metal film into the area between the heating furnace tube element on one side and the heating furnace tube element on the other side.

Needless to say, the heating furnace tube related to the present invention and the method of manufacturing the heating furnace tube related to the present invention can be effectively applied not only to the cracking tubes of an ethylene plant but also to various heating furnace tubes which are subject to carburization problems, such as CCR plant in a petroleum refining plant.

Industrial Applicability

A heating furnace tube, a method of using the heating furnace tube, and a method of manufacturing the heating furnace tube related to the present invention can be effectively applied to heating furnace tubes which are subject to coking and carburization problems.

What is claimed is:

1. A heating furnace tube used for allowing fluid containing hydrocarbon or carbon monoxide to flow, characterized in that the heating furnace tube is made of rare earth oxide dispersion strengthened ferrous alloy which contains 17–26% of Cr by weight and 2–6% of Al by weight.

2. A heating furnace tube characterized in that one heating furnace tube element made of rare earth oxide dispersion strengthened ferrous alloy which contains 17–26% of Cr by weight and 2–6% of Al by weight and another heating furnace tube element made of the rare earth oxide dispersion strengthened ferrous alloy or a heat resistant alloy are joined via insert metal by diffusion bonding.

3. The heating furnace tube according to claim 2, characterized in that the heating furnace tube allows fluid containing 100 ppm or less of S in atomic weight units to flow, and is used in a 550° C.–1000° C. temperature range.

4. The heating furnace tube according to claim 2, characterized in that the heating furnace tube comprises a coupling short pipe into which a joint side edge of said one heating furnace tube element and a joint side edge of said another heating furnace tube element are inserted, and said one heating furnace tube element and said another heating furnace tube element are joined via the coupling short pipe by performing diffusion bonding in a state where the joint side edges of said one heating furnace tube element and another heating furnace tube element and the coupling short pipe are contacted under pressure by a pressurization means, via an insert metal disposed between the joint side edges of said one heating furnace tube element and another heating furnace tube element and the coupling short pipe.

5. The heating furnace tube according to claim 4, characterized in that the pressurization means comprises a tapered surface created on an outer surface of the coupling short pipe and a tightener which engages with the tapered surface and contracts the coupling short pipe in a radius direction.

6. The heating furnace tube according to claim 4, characterized in that the insert metal is formed by plating.

7. The heating furnace tube according to claim 2, characterized in that the heating furnace tube is used in a 550° C.–1200° C. temperature range.

8. A method of manufacturing a heating furnace tube comprising one heating furnace tube element made of rare earth oxide dispersion strengthened ferrous alloy which contains 17–26% of Cr by weight and 2–6% of Al by weight; and another heating furnace tube element made of the rare earth oxide dispersion strengthened ferrous alloy or heat resistant alloy which are joined via an insert metal by diffusion bonding, characterized in that the method of manufacturing the heating furnace tube comprises the steps of:
   forming or inserting the insert metal to at least one of joint side edges of said one heating furnace tube element and said another heating furnace tube element;
   contacting with pressure the joint side edge of said one heating furnace tube element with the joint side edge of said another heating furnace tube element directly or via an intermediate member; and
   diffusion bonding of said one heating furnace tube element and said another heating furnace tube element by heating the insert metal.

9. The method of manufacturing the heating furnace tube according to claim 8, characterized in that the insert metal is formed by plating.

10. The method of manufacturing the heating furnace tube according to claim 8, characterized in that the intermediate member is a coupling short pipe to which the joint side edge of said one heating furnace tube element and the joint side edge of said another heating furnace tube element are inserted, and said one heating furnace tube element and said another heating furnace tube element are joined via the coupling pipe by performing diffusion bonding in the state where the joint side edges of said one heating furnace tube element and another heating furnace tube element and the coupling short pipe are contacted under pressure by a pressurization means, via insert metal disposed between the joint side edges of said one heating furnace tube element and another heating furnace tube element and the coupling short pipe.

11. The method of manufacturing heating furnace tube according to claim 9, characterized in that the pressurization means comprises a tapered surface formed on an outer surface of the coupling short pipe and a tightener which engages with the tapered surface and contacts the coupling short pipe in a radius direction.

* * * * *